Patented Sept. 4, 1951

2,567,000

UNITED STATES PATENT OFFICE 2,567,000

PRODUCTION OF DEXTROSE

Leo Wallerstein and Irwin Stone, New York, N. Y., assignors to Wallerstein Company, Inc., New York, N. Y., a corporation of New York No Drawing. Application February 27, 1948, Serial No. 11,832

8 Claims. (Cl. 195—11)

This invention relates to the manufacture of crystalline dextrose.

The present industrial manufacture of crystalline dextrose is essentially based on the conversion of starch to dextrose by means of acid, usually hydrochloric acid, as the hydrolytic agent. In this manufacturing process, economic as well as technical requirements result in the formation of a considerable amount of by-products of little value. Also, the resulting crystallization and separation of crystals involves great difficulty.

One of the chief disadvantages of the acid conversion process is the formation of substantial amounts of reversion products. Extremely large seedings are necessitated, and considerable tie-up in equipment and material is involved during the long, slow crystallization process. Very careful temperature control is also an important requirement. Special processes for recycling and reconversion of the mother liquors for efficient yields, and the production of large amounts of hydrol are further disadvantages in the present art.

In co-pending application Serial No. 779,635 of Leo Wallerstein, filed October 13, 1947, Patent No. 2,531,999, there is described a method in which an aqueous dispersion of starch or a starch conversion product is subjected to the action of a microbiological enzyme having starch-gluogenase activity to produce susbtantially complete conversion to dextrose, the product is maintained at crystallizing temperature, advantageously in the presence of dextrose crystals, until a substantial proportion of discrete dextrose crystals have formed, and the dextrose crystals are separated from the mother liquor.

We have found that the mother liquor resulting from the separation of the dextrose crystals contains the original enzyme used in the process and, if certain precautions are taken, their activity may be retained without appreciable loss. This mother liquor may then be utilized to hydrolyze subsequent batches of starch or starch conversion products by merely adding it to these subsequent batches in place of fresh enzyme. The precaution to be observed in the process in order to retain the activity of the enzyme is to conduct any evaporation at low temperatures, preferably below 50° C., in order to avoid heat inactivation of the enzyme. We have also found that the normal decolorization step for clarifying the hydrolyzates with carbon does not remove the enzyme activity. The enzyme activity of the enzyme is also not adsorbed on the dextrose crystals during the crystallization step.

If starch conversion products, such as corn syrup, at a concentration of about 65% solids, are treated with a starch-glucogenase enzyme preparation, discrete crystals of dextrose are deposited from the hydrolysates in readily separable form on maintaining the hydrolysates at a suitable crystallizing temperature. This eliminates the evaporation step and the mother liquors contain substantially the entire starch-glucogenase activity originally added thereto. It is to be understood, however, that hydrolysates may be used containing as low as 50% solids content or as high a soluble content as viscosity permits without unduly sacrificing workability in subsequent processing steps.

Even when the starch or starch conversion product is treated in dilute solution with the starch-glucogenase enzyme it is still possible to conserve a substantial proportion of the enzyme activity in the eventual mother liquors by carrying out the concentration of the hydrolysates at a temperature not exceeding about 50° C., for example, by vacuum evaporation to a concentration of from about 50% to about 80% solids. Temperatures exceeding 50° C. may be employed for only very short time periods such as under conditions for continuous flash evaporation.

The amount of reversion products interfering with crystallization which are formed in the production of dextrose from starches or starch conversion products by starch glucogenase enzyme preparations is so small that the mother liquors may be recycled repeatedly without reducing substantially the rapidity of formation of discrete dextrose crystals in the hydrolysates or the relatively facile separation of the crystals from the mother liquors.

The starch-glucogenase enzymes useful in the invention may be obtained from various fungal sources, particularly the species of Aspergillus, such as Aspergillus oryzae and from certain bacterial species, for example, Clostridium acetobutylicum.

The starch-glucogenase activity of the enzyme preparations may be expressed conveniently in terms of the unimolecular reaction constant "$k$" which represents the initial reaction velocity of the formation of dextrose. When tested under prescribed conditions as described in co-pending application to Leo Wallerstein Serial No. 779,635, this constant "$k$" may be calculated which is a measure of the strength of the enzyme.

It has been found that the course of the formation of dextrose from Lintner starch as a result of the starch-glucogenase activity of the enzyme preparation follows the unimolecular reaction law as expressed by the equation $$k = \frac{1}{t} \log 10 \frac{a}{a-x}$$

wherein $k$ is the unimolecular reaction constant, $t$ is the time, $a$ is the initial concentration and $a-x$ is the concentration of the starch at time "$t$."

For starch-glucogenase activity, the value of $k$ has been found to be substantially proportional to enzyme activity when tested under conditions such that about 50% hydrolysis is effected on a 1% Lintner starch solution at a pH value of 5.0 and a temperature of 40° C. in 30 minutes. For the determination, 5 ml. of a "test" solution of the enzyme preparation is added to a solution containing 25 ml. of water and 10 ml. of a 1% Lintner starch solution buffered at pH 5.0 and the hydrolysis is allowed to proceed for exactly 30 minutes at 40° C. 2 ml. of a 5% sodium carbonate solution is then added to stop hydrolysis and the volume is made up to 50 ml. with water. The quantity of dextrose formed by the action of the enzyme on the starch is determined colorimetrically by the Tauber and Kleiner method as modified by Gray and Rothchild, Ind. and Eng. Chem., Anal. Ed., vol. 13, 902 (1941). The value of $k$ for the enzyme "test" solution is defined as calculated from the data thus obtained by the equation $$k \text{ (of "test" solution)} = \frac{1}{30} \log \frac{100}{100-x}$$

wherein $x$ is the percent hydrolysis calculated from the amount of dextrose formed. A "$k$" value, based on 100 grams of the enzyme preparation, is calculated by the equation "$k$" (per 100 gm. enzyme preparation) =
$$\frac{k \text{ (of "test" solution)} \times 100}{\text{Concentration of enzyme preparation in "test" solution (in grams per 100 ml.)}}$$

The "$k$" value as thus determined and calculated will be used in the specification and claims to designate the starch-glucogenase activity of an enzyme preparation.

In general, to obtain starch hydrolysates which readily form discrete crystals of dextrose it is desirable to use an enzyme preparation having a starch-glucogenase activity sufficient to effect substantially complete hydrolysis of the starch substrate in not more than 72 hours when not more than 1% of the enzyme preparation, based on the weight of the starch, is employed. Such an enzyme will have a "$k$" value of the order of 1.0. Enzyme preparations having a "$k$" value as high as 10 or even higher may be employed, the amount of the enzyme preparation used being decreased in proportion to the increasing "$k$" value. In general, the amount of the enzyme preparation used should be at least about 1/"$k$" parts of weight for each 100 parts by weight of starch or starch conversion product and preferably about two to three times this proportion of enzyme is used.

In general the rate of the enzyme action increases with increasing temperature up to the temperature at which the inactivation of the enzyme becomes substantial and the optimum temperature of operation is within the range of 25° to 50° C. The pH of the reaction mass also affects the rate of reaction and it is preferred to maintain the pH between the limits of 3.5 and 7.5, and preferably about 5.0.

Although filterable crystals may be formed by maintaining the hydrolysate at a constant temperature, even at room temperature or lower, crystallization and crystal growth may be controlled in accordance with well-known procedures for regulating the rate of cooling with respect to concentration and degree of supersaturation. In all cases, slow agitation during crystallization is preferred. While these crystals, after separating from the mother liquor and purging, may be dried by various means, it is preferred to dry them while in motion or in a suspended state to prevent agglomeration and maintain the product in the form of discrete crystals.

It is further understood that any mother liquor, before or after digestion with additional amounts of starch products may be subjected to decolorization, filtration or other purification steps, for example, contacting with ion-exchange media, as it is desirable insofar as they do not remove or inactivate the enzyme.

The method of the invention makes possible the production of full yields of crystalline dextrose from starches and starch-containing materials of practically any type, purity or preliminary treatment. The method can be applied successfully to corn starch, corn meal, wheat flour, wheat starch, tapioca starch, waxy maize starch, potatoes, sweet potatoes, sorghum and rice. It may be applied to starch products thinned and partially dextrinized by preliminary heating with dilute acid, or which have been liquefied with the aid of amylolytic enzymes, or which have been simply gelatinized, as by heating with water, without special thinning treatment.

The method of the invention may also be applied to the hydrolysates obtained by the treatment of aqueous suspensions of raw starches with combined amylolytic and starch-glucogenase enzymes as more particularly described in application Serial No. 20,601 of Leo Wallerstein and Philip P. Gray, filed April 12, 1948.

The following specific examples are illustrative of the principles of the invention:

*Example 1.*—Commercial corn syrup of 40% to 43% dextrose equivalent is diluted to 65% solids content and the pH is adjusted to about 5.0. 0.5% on the weight of the solids of a fungal enzyme preparation having a starch-glucogenase "$k$" value of about 10 is added and the mixture is maintained at 45° C. for 24 to 48 hours. 0.1% of dextrose hydrate seed crystals are then added and the liquor is held at about 20° C. The discrete dextrose crystals which form are separated from the mother liquor, purged and dried.

The mother liquor from which the crystals are separated is then brought up to a concentration of 65% solids by the addition of fresh corn syrup. The amount of corn syrup added is such that the total weight of the batch approximates the original initial weight of the first run. It is then held at 45° C. for 24 to 48 hours and crystallized at about 20° C. in the presence of seed crystals, and the resulting dextrose crystals again separated, purged and dried. The mother liquor can be used repeatedly with little loss in starch-glucogenase activity.

*Example 2.*—A 20% suspension by weight of pearl starch in water is prepared. The pH is adjusted to about 6 by $Ca(OH)_2$ and about 1% of a bacterial alpha amylase preparation is added which contains about 175 SKB units per gram of preparation as determined by the method of Sanstedt, Keen and Blish, "Cereal Chemistry," vol. 16, page 712 (1939). The temperature is raised while stirring until the starch begins to gelatinize at about 65 to 70° C. Heating is continued further until the enzymes start to thin out the starch and the temperature is raised to 80° C., and is held at that level for about 10 minutes. It is then raised to 85° C. and held for another 10 minutes. When completely thinned, the batch is allowed to cool. When cool, the pH is adjusted to 5 and 0.5% (on the weight of starch) of a fungal enzyme preparation (starch-glucogenase activity "k"=10) is added. The mass is held at 45° C. for 24 hours and is then filtered.

The clear filtrate is evaporated under vacuum at temperatures below 50° C., preferably in the neighborhood of 30° C. to 35° C. When concentrated to approximately 50% solids the batch may be treated with small amounts of carbon to decolorize it, if desired. The liquor is further evaporated to approximately 65% solids content and then brought down to crystallizing temperatures and inoculated with 0.1% of dextrose hydrate seed crystals. The batch is allowed to crystallize at suitable temperature and when completely crystallized the crystals are separated by centrifuging or filtration and the motor liquor is purged from the solids. The mother liquor, so obtained, contains the active enzymes originally used without any substantial loss.

This mother liquor can then be added to a subsequent batch of thinned starch solution and the active enzyme content fulfills in entirety or in part the enzyme requirements of the new batch. This second batch is carried through substantially as above and the second mother liquor separated from the crystallized dextrose can be used again for the third batch, and thus continuing from batch to batch with substantially little loss of enzyme activity. If it is necessary to correct for small losses of enzyme, additional amounts of the enzyme preparation may be added to the new batches.

Example 3.—A suspension of 1 part, by weight, of raw pearl starch to 3 parts by weight of water, is adjusted to pH 5.5. The temperature is raised to 35° C. and 0.5% (on the weight of the starch) of a fungal enzyme preparation having a starch-glucogenase "k" value of about 10 and 1% of a bacterial alpha amylase preparation having an alpha amylase activity of 2200 SKB units per gram of preparation are added. The mixture is stirred slowly at 35° C. for 48 hours. The mixture is filtered and the clear filtrate will contain approximately 12.5% of solids. This is evaporated under vacuum at low temperatures, not exceeding 50° C. and preferably about 30° C. to 35° C., to concentrate to a solids content of about 65%. The mass is then cooled down to crystallizing temperatures and approximately 0.1% of dextrose hydrate seed crystals are added. When crystallization is complete, the discreet crystals are separated by centrifuging or filtration and purged of the motor liquor.

The mother liquor, so obtained, contains an enzyme activity that may satisfy all or part of the enzyme requirement for a subsequent batch. This mother liquor, therefore, is added to the suspension of starch and water at that step of the process at which a fresh enzyme preparation would normally be introduced. It is sometimes necessary to add additional amounts of the enzyme preparation to bring up the strength to equal the original activity desired and thus make up for some small losses that may occur during the various processing steps. The starch used may be fresh starch or the undigested starch filtered off from a previous run. This second batch is then carried through as outlined above and the mother liquor from the second crystallization may be used in the third batch. The process is repetitive, using the mother liquor from a prior batch to treat the starch in a subsequent batch.

We claim:

1. In the production of crystalline dextrose by treating an aqueous dispersion of a substance of the group consisting of starch and starch conversion products with at least $1/"k"$ parts by weight of a starch-glucogenase enzyme, wherein "k" is the starch-glucogenase activity of the enzyme as defined herein, for each 100 parts by weight of starch or starch conversion product at a pH of from about 3.5 to about 7.5 until a substantial portion thereof is converted into dextrose, maintaining the product under crystallizing conditions until discrete crystals of dextrose are formed, and separating the dextrose crystals from the mother liquor, the improvement which comprises supplying at least a portion of the starch-glucogenase enzyme in the form of mother liquor separated from the dextrose formed in a previous treatment of starch or starch conversion product with an enzyme.

2. In the production of crystalline dextrose by treating an aqueous dispersion of a substance of the group consisting of starch and starch conversion products with at least $1/"k"$ parts by weight of a starch-glucogenase enzyme, wherein "k" is the starch-glucogenase activity of the enzyme as defined herein, for each 100 parts by weight of starch or starch conversion product at a pH of from about 3.5 to about 7.5 until a substantial portion thereof is converted into dextrose, maintaining the product under crystallizing conditions until discrete crystals of dextrose are formed, and separating the dextrose crystals from the mother liquor, the improvement which comprises supplying at least a portion of the starch-glucogenase enzyme in the form of mother liquor separated at a temperature not exceeding about 50° C. from the dextrose formed in a previous treatment of starch or starch conversion product with an enzyme.

3. A method of making crystalline dextrose which comprises treating an aqueous dispersion of a substance of the group consisting of starch and starch conversion products with at least $1/"k"$ parts by weight of a microbiological enzyme preparation having starch-glucogenase activity wherein "k" is the starch-glucogenase activity of the enzyme as defined herein, for each 100 parts of starch or starch conversion product at a pH of from about 3.5 to about 7.5 until a substantial portion thereof is converted into dextrose, maintaining the product under crystallizing conditions until discrete crystals of dextrose are formed, separating the dextrose crystals from the mother liquor, subjecting a further amount of starch substance to the action of the mother liquors until a substantial portion of said further amount of starch substance is converted to dextrose, maintaining the product under crystallizing conditions until a further portion of discrete crystals of dextrose is formed, and separating said further portion of dextrose crystals from the mother liquor.

4. A method of making crystalline dextrose which comprises treating an aqueous dispersion of a substance of the group consisting of starch and starch conversion products at a concentration of about 65% solids with at least 1/"k" parts by weight a microbiological enzyme preparation having starch-glucogenase activity wherein "k" is the starch-glucogenase activity of the enzyme as defined herein, for each 100 parts of starch or starch conversion product at a pH of from about 3.5 to about 7.5 until a substantial portion thereof is converted into dextrose, maintaining the product under crystallizing conditions until discrete crystals of dextrose are formed, separating the dextrose crystals from the mother liquor, subjecting a further amount of starch substance to the action of the mother liquors until a substantial portion of said further amount of starch substance is converted to dextrose, maintaining the product under crystallizing conditions until a further portion of discrete crystals of dextrose is formed, and separating said further portion of dextrose crystals from the mother liquor.

5. A method of making crystalline dextrose which comprises treating an aqueous dispersion of a substance of the group consisting of starch and starch conversion products with at least 1/"k" parts by weight of a microbiological enzyme preparation having starch-glucogenase activity wherein "k" is the starch-glucogenase activity of the enzyme as defined herein, for each 100 parts of starch or starch conversion product at a pH of from about 3.5 to about 7.5 until a substantial portion thereof is converted into dextrose, evaporating to a concentration of from about 60% to about 80% solids at a temperature not exceeding about 50° C., maintaining the product under crystallizing conditions until discrete crystals of dextrose are formed, separating the dextrose crystals from the mother liquor, subjecting a further amount of starch substance to the action of the mother liquors until a substantial portion of said further amount of starch sbstance is converted to dextrose, maintaining the product under crystallizing conditions until a further portion of discrete crystals of dextrose is formed, and separating said further portion of dextrose crystals from the mother liquor.

6. In the production of crystalline dextrose, the step which comprises adding a substance of the group consisting of starch and starch conversion products to the mother liquor obtained by subjecting an aqueous dispersion of a substance of the group consisting of starch and starch conversion products to the action of at least 1/"k" parts by weight of a microbiological enzyme preparation having starch-glucogenase activity wherein "k" is the starch-glucogenase activity of the enzyme as defined herein, for each 100 parts of starch or starch conversion product at a pH of from about 3.5 to about 7.5 to convert a substantial proportion of the substance to dextrose, maintaining the product thus obtained at crystallizing temperature until a substantial proportion of discrete dextrose crystals have formed and separating the dextrose crystals from the mother liquor.

7. In the production of crystalline dextrose, the step which comprises adding a substance of a group consisting of starch and starch conversion products to the mother liquor obtained by subjecting an aqueous dispersion of a substance of the group consisting of starch and starch conversion products at a concentration of about 65% solids to the action of at least 1/"k" parts by weight of a microbiological enzyme preparation having starch-glucogenase activity wherein "k" is the starch-glucogenase activity of the enzyme as defined herein, for each 100 parts of starch or starch conversion product at a pH of from about 3.5 to about 7.5 to convert a substantial proportion of the substance to dextrose, maintaining the product thus obtained at crystallizing temperature until a substantial proportion of discrete dextrose crystals have formed and separating the dextrose crystals from the mother liquor.

8. In the production of crystalline dextrose, the step which comprises adding a substance of the group consisting of starch and starch conversion products to the mother liquor obtained by subjecting an aqueous dispersion of a substance of the group consisting of starch and starch conversion products to the action of at least 1/"k" parts by weight of a microbiological enzyme preparation having starch-glucogenase activity wherein "k" is the starch-glucogenase activity of the enzyme as defined herein, for each 100 parts of starch or starch conversion product at a pH of from about 3.5 to about 7.5 to convert a substantial proportion of the substance to dextrose, evaporating to a concentration of from about 60% to about 80% solids at a temperature not exceeding about 50° C., maintaining the product thus obtained at crystallizing temperature until a substantial proportion of discrete dextrose crystals have formed and separating the dextrose crystals from the mother liquor.

LEO WALLERSTEIN.
IRWIN STONE.

REFERENCES CITED

The following references are of record in the file of this patent:

UNITED STATES PATENTS

| Number | Name | Date |
|---|---|---|
| 1,329,214 | Weizmann et al. | Jan. 27, 1920 |
| 2,201,609 | Dale et al. | May 21, 1940 |
| 2,302,310 | Glarum et al. | Nov. 17, 1942 |
| 2,305,168 | Langlois | Dec. 15, 1942 |

Certificate of Correction

Patent No. 2,567,000 September 4, 1951

LEO WALLERSTEIN ET AL.

It is hereby certified that error appears in the printed specification of the above numbered patent requiring correction as follows:

Column 7, line 39, for "sbstance" read *substance*; column 8, line 6, for "of a" read *of the*;

and that the said Letters Patent should be read as corrected above, so that the same may conform to the record of the case in the Patent Office.

Signed and sealed this 6th day of November, A. D. 1951.

[SEAL]

THOMAS F. MURPHY,
*Assistant Commissioner of Patents.*